US007422703B2

(12) United States Patent
Yi et al.

(10) Patent No.: US 7,422,703 B2
(45) Date of Patent: Sep. 9, 2008

(54) NANOMETER-SIZED UP-CONVERTING PHOSPHOR FLUORIDE PARTICLES AND PROCESS OF PREPARATION

(75) Inventors: Guangshun Yi, Beijing (CN); Baoquan Sun, Shangdong Province (CN); Depu Chen, Beijing (CN); Yuxiang Zhou, Beijing (CN); Jing Cheng, Beijing (CN); Wenjun Yang, Beijing (CN); Yue Ge, Beijing (CN); Lianghong Guo, Beijing (CN)

(73) Assignee: Capital Biochip Company Ltd, Beijing (CN)

( * ) Notice: Subject to any disclaimer, the term of this patent is extended or adjusted under 35 U.S.C. 154(b) by 329 days.

(21) Appl. No.: 10/511,363

(22) PCT Filed: Apr. 15, 2003

(86) PCT No.: PCT/CN03/00268

§ 371 (c)(1),
(2), (4) Date: Jun. 3, 2005

(87) PCT Pub. No.: WO03/087259

PCT Pub. Date: Oct. 23, 2003

(65) Prior Publication Data

US 2006/0003466 A1 Jan. 5, 2006

(30) Foreign Application Priority Data

Apr. 15, 2002 (CN) ................. 02 1 16679

(51) Int. Cl.
*C09K 11/85* (2006.01)

(52) U.S. Cl. ................. 252/301.4 H; 977/830; 977/834

(58) Field of Classification Search .......... 252/301.4 H; 977/830, 834; 428/404, 403; 436/526
See application file for complete search history.

(56) References Cited

U.S. PATENT DOCUMENTS 5,674,698 A * 10/1997 Zarling et al. .............. 435/7.92
5,891,361 A * 4/1999 Kane .................. 252/301.4 H (Continued)

FOREIGN PATENT DOCUMENTS

CN 1134861 A 11/1996

(Continued)

OTHER PUBLICATIONS

International Search Report for PCT/CN03/00268, 1 page, mailed on Jul. 24, 2003.

(Continued)

*Primary Examiner*—C. Melissa Koslow
(74) *Attorney, Agent, or Firm*—Morrison & Foerster LLP

(57) ABSTRACT

Nanometer-scaled up-converting fluoride phosphor particles and processes of making them are disclosed. In the process, an aqueous solution consisting of soluble salts of rare-earth metal ions at a molar ratio of (yttrium, lanthanum or gadolinium): ytterbium:(erbium, holmium, terbium or thulium)= (70-90):(0-29):(0.001-15) is mixed a rare-earth metal chelator and a soluble fluoride salt to form precipitates, which are then annealed at an elevated temperature to produce nanometer-scaled up-converting fluoride phosphor particles. The particle size is between 35 nm and 200 nm, and can be controlled by the amount of the metal chelator added to the solution. The nanometer-sized particle is applicable to many biological assays.

14 Claims, 3 Drawing Sheets

U.S. PATENT DOCUMENTS

| | | | |
|---|---|---|---|
| 6,312,914 B1 | 11/2001 | Kardos et al. | |
| 2003/0032192 A1* | 2/2003 | Haubold et al. | 436/56 |

FOREIGN PATENT DOCUMENTS

| CN | 1185475 A | 6/1998 |
|---|---|---|
| CN | 1357599 A | 7/2002 |
| JP | 4328191 A | 11/1992 |
| JP | 8-501632 A | 2/1996 |
| WO | WO-94/07142 A1 | 3/1994 |
| WO | WO-97/46488 | 12/1997 |
| WO | WO-00/56837 A1 | 9/2000 |
| WO | WO-00/56837 B1 | 9/2000 |
| WO | WO 02/20696 * | 3/2002 |
| WO | WO-02/20696 A1 | 3/2002 |

OTHER PUBLICATIONS

Supplementary European Search Report mailed Jun. 5, 2007, for EP Application No. 03720096.1, filed Apr. 15, 2003, three pages.

* cited by examiner

NANOMETER-SIZED UP-CONVERTING PHOSPHOR FLUORIDE PARTICLES AND PROCESS OF PREPARATION

CROSS-REFERENCE TO RELATED APPLICATIONS

This application is the national phase of PCT application PCT/CN03/00268 having an international filing date of Apr. 15, 2003, which claims priority from China application 02116679.X filed Apr. 15, 2002. The contents of these documents are incorporated herein by reference.

TECHNICAL FIELD

The present invention relates to nanometer-sized fluorescent particles and process of making them. More particularly, the present invention relates to rare-earth ion doped, nanometer-sized up-converting phosphor fluoride particles and process of making them.

BACKGROUND ART

Up-converting phosphor is a type of material that emits visible light when excited by long wavelength light. Ytterbium/erbium co-doped fluoride is a high efficiency up-converting phosphor that emits strong green fluorescence and relatively weak red fluorescence when excited by 946-970 nm infrared light.

Due to their unique properties, up-converting phosphors are used in the fabrication of light-emitting diodes, solid-state lasers, and as ultra-sensitive fluorescent labels in biological detections (U.S. Pat. No. 5,674,698).

As a fluorescent label for biological molecules, the phosphor must be small in size and uniform, highly luminescent, and stable in aqueous environment. We have disclosed a method of preparing nanometer-sized molybdenum up-converting phosphor particles (Patent Number: CN 01134861.5). With this method, particles of 50-60 nm in diameter were prepared. They were easy to make, and highly luminescent. But the range of particle size was limited to 50-60 nm. And the annealing temperature is high. James Kane has disclosed in U.S. Pat. No. 5,891,361 and WO 97/46488 a process for preparing small up-converting fluoride phosphor particles. The process involves high temperature (750° C.) heating, and the size of the particle (about 400 nm) thus obtained is too large for many biological applications.

DISCLOSURE OF THE INVENTION

The present invention relates to nanometer-sized fluorescent particles and process of making them.

The aim of this invention is to disclose nanometer-scaled up-converting fluoride phosphor particles and processes of making them. The size of the phosphor particles can be varied over a range of about 35 nm to 350 nm in a controlled fashion, which is significantly smaller than those disclosed in prior arts. The particles are uniform in size and highly luminescent. In addition, the phosphor particles are prepared at annealing temperatures much lower than those employed in prior arts. Therefore, the nanometer-scaled up-converting fluoride phosphor particles disclosed in this application are more applicable to biological detections.

In one aspect, the present invention is directed to a phosphor fluoride particle that emits light in the visible wavelength range when excited by long wavelength light that has a uniform particle size of less than 350 nanometers.

In another aspect, the present invention is directed to a process of preparing a phosphor fluoride particle that emits light in the visible wavelength range when excited by long wavelength light that has a uniform particle size of less than 350 nanometers, which process comprises: a) preparing an aqueous solution of soluble salts of a phosphor host, an absorber/emitter pair and a rare-earth metal chelator; and b) contacting said prepared aqueous solution of soluble salts of said phosphor host, absorber/emitter pair and rare-earth metal chelator with an-aqueous fluoride-containing compound at a temperature ranging from about 0° C. to about 100° C. for a sufficient time to obtain a precipitate of a phosphor fluoride particle; and c) heating said precipitate at a temperature ranging from about 300° C. to about 450° C. for a time ranging from about 1 hour to about 10 hours to obtain a phosphor fluoride particle that emits light in the visible wavelength range when excited by long wavelength light that has a uniform particle size of less than 350 nanometers.

MODES OF CARRYING OUT THE INVENTION

Figure 1:
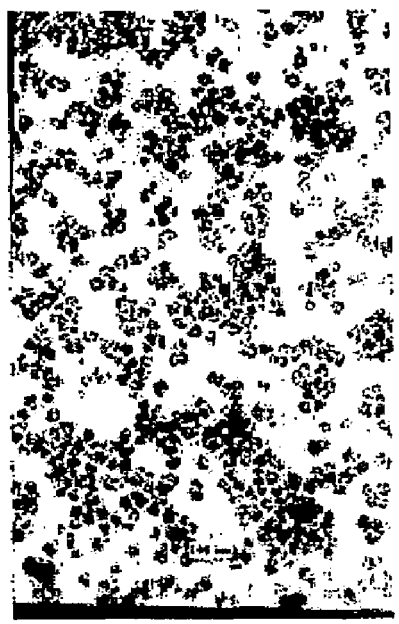
FIG. 1 illustrates a transmission electron micrograph (TEM) of phosphor fluoride particles with a uniform particle size of about 37 nanometers prepared by the process described in Example 1.
Figure 2:
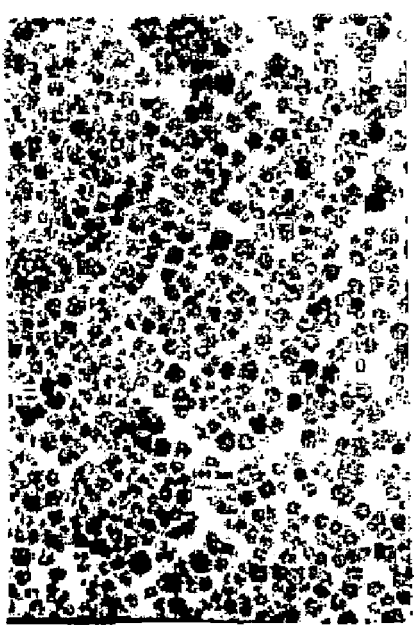
FIG. 2 illustrates a TEM of phosphor fluoride particles with a uniform particle size of about 43 nanometers prepared by the process described in Example 2.
Figure 3:
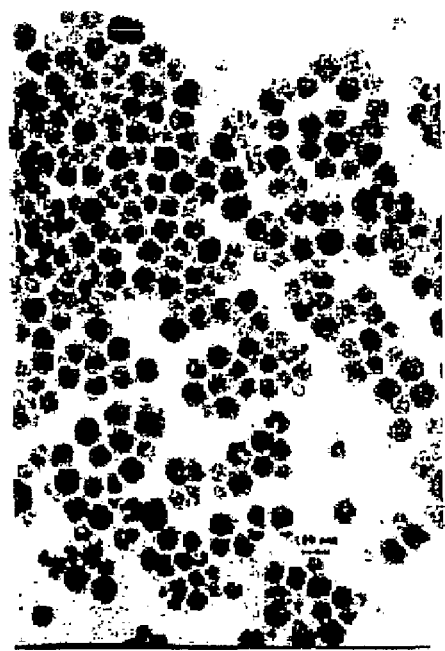
FIG. 3 illustrates a TEM of phosphor fluoride particles with a uniform particle size of about 77 nanometers prepared by the process described in Example 3.
Figure 4:
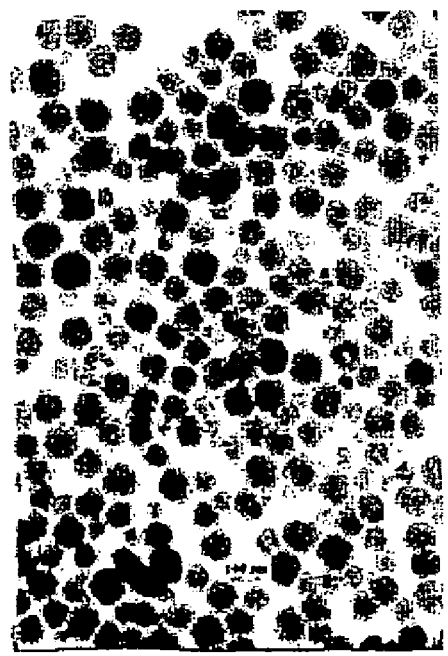
FIG. 4 illustrates a TEM of phosphor fluoride particles with a uniform particle size of about 96 nanometers prepared by the process described in Example 4.
Figure 5:
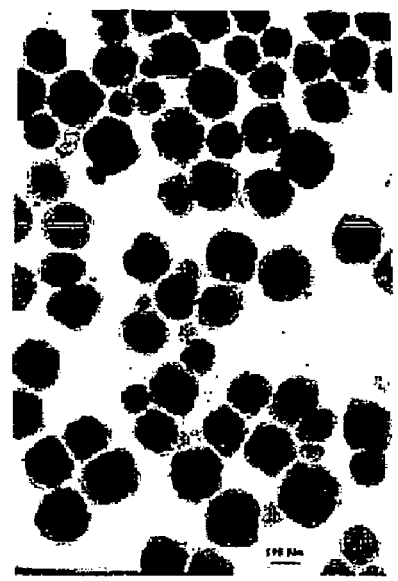
FIG. 5 illustrates a TEM of phosphor fluoride particles with a uniform particle size of about 166 nanometers prepared by the process described in Example 5.
Figure 6:
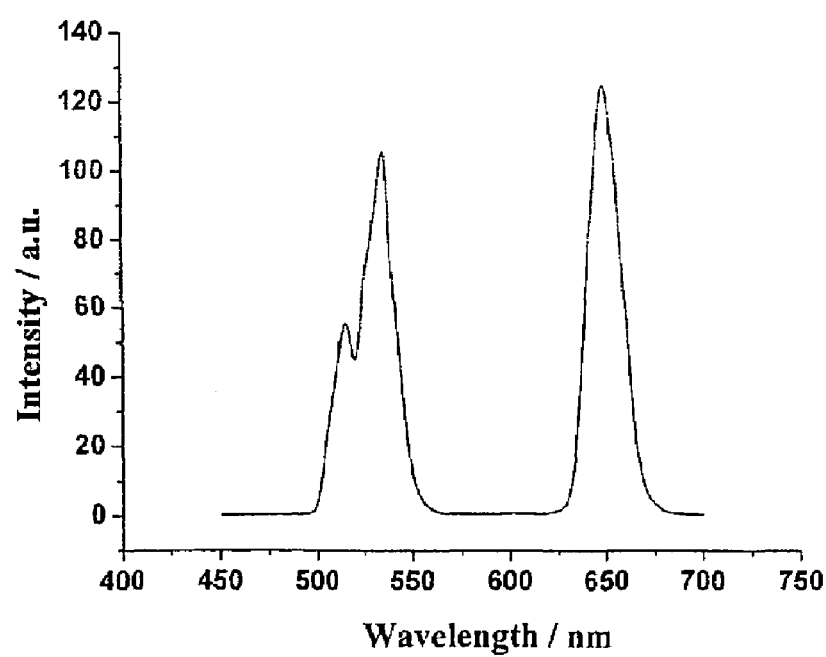
FIG. 6 illustrates up-converting fluorescent spectrum of phosphor fluoride particles with a uniform particle size of about 37 nanometers prepared by the process described in Example 1.

For clarity of disclosure, and not by way of limitation, the detailed description of the invention is divided into the subsections that follow.

A. Definitions

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, "a uniform particle size" means that a group of particles has a standard deviation of particle sizes that equals to or is less than 20%. Preferably, the group of particles has a standard deviation of particle sizes that equals to or is less than 15%, 10%, 5%, 2%, 1%, or less than 1%.

As used herein, "phosphor" means solid, inorganic, crystalline material that shows luminescence upon optical excitation.

As used herein, "phosphor host" means one (and usually the major one) of the three components in a phosphor which does not participate in the light absorption or light emission process, but provides structural environment for the other two components.

As used herein, "absorber/emitter pair" means the two components in a phosphor which respectively absorbs longer-wavelength light and emits shorter-wavelength light to complete the up-converting process.

B. Phosphor Fluoride Particles

In one aspect, the present invention is directed to a phosphor fluoride particle that emits light in the visible wavelength range when excited by long wavelength light that has a uniform particle size of less than 350 nanometers.

Preferably, the phosphor fluoride particle comprises a phosphor host and an absorber-emitter pair. Any suitable phosphor host, e.g., yttrium, lanthanum or gadolinium, can be used in the present phosphor fluoride particle. Any suitable absorber, e.g., ytterbium, can be used in the present phosphor fluoride particle. Any suitable emitter, e.g., erbium, holmium, terbium or thulium, can be used in the present phosphor fluoride particle.

In a specific embodiment, the absorber is ytterbium and the emitter is erbium, holmium, terbium or thulium.

In another specific embodiment, the particle has a molar ratio:

(yttrium, lanthanum or gadolinium):ytterbium:(erbium, holmium, terbium or thulium)=(70-90):(0-29):(0.001-15).

In still another specific embodiment, the phosphor fluoride particle has a formula of $YF_3$:Yb,Er.

In still another specific embodiment, the phosphor fluoride particle has a formula of $NaYF_4$:Yb,Er.

The phosphor fluoride particle can have any size that is less than 350 nanometers. For example, the phosphor fluoride particle can have a particle size ranging from about 35 nanometers to about 200 nanometers.

In yet another specific embodiment, the phosphor fluoride particle can further comprise a transparent coating layer. The coated particle can further comprise a layer of immobilized biological moiety, e.g., a biological molecule. Exemplary biological moieties include a cell, a cellular organelle, a virus, a molecule and an aggregate or complex thereof.

The phosphor fluoride particle can have any suitable shape, e.g., a rectangle, a circle, an ellipse, or other regular or irregular shapes. Preferably, phosphor fluoride particle has a spherical shape.

C. Processes of Preparing Phosphor Fluoride Particles

In another aspect, the present invention is directed to a process of preparing a phosphor fluoride particle that emits light in the visible wavelength range when excited by long wavelength light that has a uniform particle size of less than 350 nanometers, which process comprises: a) preparing an aqueous solution of soluble salts of a phosphor host, an absorber/emitter pair and a rare-earth metal chelator; and b) contacting said prepared aqueous solution of soluble salts of said phosphor host, absorber/emitter pair and rare-earth metal chelator with an aqueous fluoride-containing compound at a temperature ranging from about 0° C. to about 100° C. for a sufficient time to obtain a precipitate of a phosphor fluoride particle; and c) heating said precipitate at a temperature ranging from about 300° C. to about 450° C. for a time ranging from about 1 hour to about 10 hours to obtain a phosphor fluoride particle that emits light in the visible wavelength range when excited by long wavelength light that has a uniform particle size of less than 350 nanometers.

Any suitable phosphor host can be used in the present processes. For example, yttrium, lanthanum or gadolinium can be used as the phosphor host in the present processes. Any suitable absorber can be used in the present processes. For example, ytterbium can be used as the absorber in the present processes. Any suitable emitter can be used in the present processes. For example, erbium, holmium, terbium or thulium can be used as the emitter in the present processes. In a specific embodiment, the absorber is ytterbium and the emitter is erbium, holmium, terbium or thulium.

Any suitable rare-earth metal chelator can be used in the present processes. For example, ethylenediamineteraacetic acid, triethylenetetraaminhexaacetic acid, diethylenetri-aminepentaacetic acid, hydroxyethylethylenediamin-etriacetic acid, 1,2-diaminocyclohexanetetraacetic acid, ethylene glycol bis (b-aminoethylether) tetraacetic acid and a salt thereof can be used as the rare-earth metal chelator in the present processes.

Any suitable aqueous fluoride-containing compound can be used in the present processes. For example, NaF, KF, $NH_4F$ and HF can be used as the aqueous fluoride-containing compound in the present processes. The aqueous fluoride-containing compound can be contained in an aqueous solution prior to or concurrently with contacting with the prepared aqueous solution of soluble salts of the phosphor host, the absorber/emitter pair and the rare-earth metal chelator. The amount of the rare-earth metal chelator and the amount of total rare-earth ions in the aqueous solution can have any suitable ratios. For example, the amount of the rare-earth metal chelator can be about 0-1 times the amount of total rare-earth ions in the aqueous solution.

The soluble salts of the phosphor host and the absorber/emitter pair can be prepared by any suitable methods. For example, the soluble salts of the phosphor host and the absorber/emitter pair can be obtained by dissolving the corresponding metal oxide in hydrochloric acid or nitric acid and subsequently removing the residual acid.

The present process can further comprise coating the prepared phosphor fluoride particle with a transparent layer, e.g., a $SiO_2$ layer. The present process can further comprise immobilizing any desirable moieties, e.g., biological molecules, to the phosphor fluoride particle. For example, the present process can further comprise immobilizing a biological molecule to the $SiO_2$-protected particle. Any suitable biological molecule can be used. Exemplary biological molecules include an amino acid, a peptide, a protein, a nucleoside, a nucleotide, an oligonucleotide, a nucleic acid, a vitamin, a monosaccharide, an oligosaccharide, a carbohydrate, a lipid and a complex thereof.

In still another aspect, the present invention is directed to a phosphor fluoride particle that is prepared by the above-described process. Preferably, the phosphor fluoride particle has a molar ratio: (yttrium, lanthanum or gadolinium):ytterbium:(erbium, holmium, terbium or thulium)=(70-90):(0-29):(0.001-15). Preferably, the phosphor fluoride particle has a formula of $YF_3$:Yb,Er. Also preferably, the phosphor fluoride particle has a formula of $NaYF_4$:Yb,Er. Still preferably, the phosphor fluoride particle has a particle size from about 35 nanometers to about 200 nanometers.

D. EXAMPLES

The nanometer-scaled up-converting fluoride phosphor particles prepared in the process disclosed in the invention has the following characteristics: (a) The particle size is on the nanometer scale and as small as 37 nm. (b) The particle size can be varied between 37 nm and 166 nm by controlling the amount of the rare-earth metal chelator. (c) The up-converting fluorescence of the fluoride phosphor is four times higher than that of the molybdenum phosphor. (d) The particles are prepared at a much lower annealing temperature. (e) The process is highly reproducible. Variation of the particle size between two preparations is less than 5%.

Example 1

Preparation of 37 nm Up-converting Fluoride Phosphors (1) Yttrium chloride ($YCl_3$) was obtained by dissolving 11.2905 g of yttrium oxide ($Y_2O_3$) in hydrochloric acid (HCl) or nitric acid ($HNO_3$). The mixture was heated and the solvent was let evaporated. Five hundred milliliters of de-ionized water was then added to re-dissolve the solid to yield a 0.2 M $YCl_3$ stock solution. Five hundred milliliters of 0.2 M stock solutions of gadolinium chloride ($GdCl_3$), lanthanum chloride ($LaCl_3$), ytterbium chloride ($YbCl_3$), erbium chloride ($ErCl_3$), thulium chloride ($TmCl_3$), and holmiiium chloride ($HoCl_3$) were prepared in the same way from 18.125 g of $Gd_2O_3$, 16.3 g of $La_2O_3$, 19.7 g of $Yb_2O_3$, 19.1 g of $Er_2O_3$, 19.3 g of $Tm_2O_3$ and 18.9 g of $Ho_2O_3$, respectively. Stock solutions of $YCl_3$, $YbCl_3$ and $ErCl_3$ were mixed at a volume ratio of 6 mL:3.4 mL:0.6 mL and added into a 100 mL three-necked Erlenmeryer flask. The molar ratio of lanthanide ions in the mixture was $Y^{3+}:Yb^{3+}:Er^{3+}=80:17:3$.

(2) 20 mL of 0.2M ethylenediamineteraacetic acid (EDTA) solution was introduced to the solution prepared in (1).

(3) A sodium fluoride (NaF) solution was prepared by dissolving 2.1 g of NaF in 60 mL of de-ionized water. The solution prepared in (2) was injected into the NaF solution. The mixture was stirred vigorously for 1 h at room temperature.

(4) The obtained precipitates were centrifuged, washed three times with de-ionized water, and dried.

(5) The precursors obtained in (4) were-heated at 400° C. for 4 h. The nanometer-sized up-converting fluorescent particles were obtained with an average diameter of 37 nm.

Example 2

Preparation of 43 nm Up-converting Fluoride Phosphors (1) Stock solutions of $YCl_3$, $YbCl_3$ and $TmCl_3$ were mixed at a volume ratio of 17.4 mL:2.6 mL:0.02 mL and added into a 100 mL three-necked Erlenmeryer flask. The molar ratio of lanthanide ions in the mixture was $Y^{3+}:Yb^{3+}:Er^{3+}=87:13:0.1$.

(2) 15 mL of 0.2 M EDTA solution was introduced to the solution prepared in (1).

(3) A NaF solution was prepared by dissolving 2.1 g of NaF in 65 mL of de-ionized water. The solution prepared in (2) was injected into the NaF solution. The mixture was stirred vigorously for 1 h at room temperature.

(4) The obtained precipitates were centrifuged, washed three times with de-ionized water, and dried.

(5) The precursors obtained in (4) were heated at 400° C. for 4 h. The nanometer-sized up-converting fluorescent particles were obtained with an average diameter of 43 nm.

Example 3

Preparation of 77 nm Up-converting Fluoride Phosphors (1) Stock solutions of $YCl_3$, $YbCl_3$ and $HoCl_3$ were mixed at a volume ratio of 16 mL:3.86 mL:0.04 mL and added into a 100 mL three-neck Erlenmeryer flask. The molar ratio of lanthanide ions in the mixture was $Y^{3+}:Yb^{3+}:Er^{3+}=80:19.8:0.2$.

(2) 10 mL of 0.2 M EDTA solution was introduced to the solution prepared in (1).

(3) A solution of NaF was prepared by dissolving 2.1 g of NaF in 70 mL of de-ionized water. The solution prepared in (2) was injected into the NaF solution. The mixture was stirred vigorously for 1 h at room temperature.

(4) The obtained precipitates were centrifuged, washed three times with de-ionized water, and dried.

(5) The precursors obtained in (4) were heated at 400° C. for 5 h. The nanometer-sized up-converting fluorescent particles were obtained with an average diameter of 77 nm.

Example 4

Preparation of 96 nm Up-converting Fluoride Phosphors (1) Stock solutions of $GdCl_3$, $YbCl_3$ and $ErCl_3$ were mixed at a volume ratio of 14 mL:5.8 mL:0.2 mL and added into a 100 mL three-neck Erlenmeryer flask. The molar ratio-of lanthanide ions in the mixture was $Y^{3+}:Yb^{3+}:Er^{3+}=70:29:1$.

(2) 5 mL of 0.2 M EDTA solution was introduced to the solution prepared in (1).

(3) A solution of ammonium fluoride ($NH_4F$) was prepared by dissolving 2.1 g of $NH_4F$ in 75 mL of de-ionized water. The solution prepared in (2) was injected into the $NH_4F$ solution. The mixture was stirred vigorously for 1 h at room temperature.

(4) The obtained precipitates were centrifuged, washed three times with de-ionized water, and dried.

(5) The precursors obtained in (4) were heated at 350° C. for 5 h. The nanometer-sized up-converting fluorescent particles were obtained with an average diameter of 96 nm.

Example 5

Preparation of 166 nm Up-converting Fluoride Phosphors (1) Stock solutions of $LaCl_3$ and $ErCl_3$ were mixed at a volume ratio of 18 mL:2 mL and added into a 100 mL three-neck Erlenmeryer flask. The molar ratio of lanthanide ions in the mixture was $La^{3+}:Yb^{3+}:Er^{3+}=90:0:10$.

(2) A solution of potassium fluoride (KF) was prepared by dissolving 2.1 g of KF in 75 mL of de-ionized water. The solution prepared in (2) was injected into the KF solution The mixture was stirred vigorously for 1 h at room temperature.

(3) The obtained precipitates were centrifuged, washed three times with de-ionized water, and dried.

(4) The precursors obtained in (4) were annealed heated at 400° C. for 5 h. The nanometer-sized up-converting fluorescent particles were obtained with average diameter of 166 nm.

Example 6

Preparation of 43 nm Up-converting Fluoride Phosphor with TTHA Chelator (1) Stock solutions of $YCl_3$, $YbCl_3$ and $ErCl_3$ were mixed at a volume ratio of 16 mL:3.6 mL:0.4 mL and added into a 100 mL three-neck Erlenmeyer flask. The molar ratio of lanthanide ions in the mixture was $Y^{3+}:Yb^{3+}:Er^{3+}=80:18:2$.

(2) 5 mL of 0.2 M triethylenetetraaminhexaacetic acid (TTHA) solution was introduced to the solution prepared in (1).

(3) A solution of NaF was prepared by dissolving 2.1 g of NaF in 75 mL of de-ionized water. The solution described in (2) was injected into the NaF solution at 50° C. The mixture was stirred vigorously for 1 h at room temperature.

(4) The obtained precipitates were centrifuged, washed three times with de-ionized water, and dried. The average diameter of the precursor particles was 43 nm.

(5) The precursors obtained in (4) were heated at 350° C. for 5 h. The nanometer-sized up-converting fluorescent particles were then obtained.

Example 7

Preparation of Up-converting Fluoride Phosphor with DTPA Chelator (1) Stock solutions of $GdCl_3$, $YbCl_3$ and $ErCl_3$ were mixed at a volume ratio of 16 mL:3.9 mL:0.02 mL and added into a 100 mL three-neck Erlenmeyer flask. The molar ratio of lanthanide ions in the mixture was $Y^{3+}:Yb^{3+}:Er^{3+}=80:19.5:0.5$.

(2) 20 mL of 0.2 M diethylenetriaminepentaacetic acid (DTPA) solution was introduced to the solution prepared in (1).

(3) A solution of NaF was prepared by dissolving 2.1 g of NaF in 60 mL of de-ionized water followed by addition of 20 mL of 0.2 M EDTA solution. The solution prepared in (2) was injected into the NaF solution. The mixture was stirred vigorously for 1 h at room temperature.

(4) The obtained precipitates were centrifuged, washed three times with de-ionized water, and dried.

(5) The precursors obtained in (4) were annealed heated at 380° C. or 8 h. The nanometer-sized up-converting fluorescent particles were then obtained.

Example 8

Preparation of Up-converting Fluoride Phosphors with HEDTA Chelator (1) Stock solutions of $YCl_3$, $YbCl_3$ and $ErCl_3$ were mixed at a volume ratio of 15.4 mL:4 mL:0.6 mL and added into a 100 mL three-neck Erlenmeyer flask. The molar ratio of lanthanide ions in the mixture was $Y^{3+}:Yb^{3+}:Er^{3+}=77:20:3$.

(2) 20 mL of 0.2 M hydroxyethylethylenediaminetriacetic acid (HEDTA) solution was introduced to the solution prepared in (1).

(3) A solution of NaF was prepared by dissolving 2.1 g of NaF in 75 mL of deionized water. The solution prepared in (2) was injected into the NaF solution at 100° C. The mixture was stirred vigorously for 1 h at room temperature.

(4) The obtained precipitates were centrifuged, washed three times with de-ionized water, and dried. The average diameter of the precursor particles was 60 nm.

(5) The precursors obtained in (4) were heated at 450° C. or 1 h. The nanometer-sized up-converting fluorescent particles were then obtained.

Example 9

Preparation of Up-converting Fluoride Phosphors with DCTA Chelator (1) Stock solutions of $YCl_3$, $YbCl_3$ and $ErCl_3$ were mixed at a volume ratio of 15.4 mL:4 mL:0.6 mL and added into a 100 mL three-neck Erlenmeyer flask. The molar ratio of lanthanide ions in the mixture was $Y^{3+}:Yb^{3+}:Er^{3+}=77:20:3$.

(2) 20 mL of 0.2 M 1,2-diaminocyclohexanetetraacetic acid (DCTA) solution was introduced to the solution prepared in (1).

(3) A solution of NaF was prepared by dissolving 2.1 g of NaF in 60 mL of deionized water. The solution prepared in (2) was injected into the NaF solution at 100° C. The mixture was stirred vigorously for 1 h at room temperature.

(4) The obtained precipitates were centrifuged, washed three times with de-ionized water, and dried. The average diameter of the precursor particles was 60 nm.

(5) The precursors obtained in (4) were heated at 450° C. or 1 h. The nanometer-sized up-converting fluorescent particles were then obtained.

Example 10

Preparation of Up-converting Fluoride Phosphors with EGTA Chelator (1) Stock solutions of $YCl_3$, $YbCl_3$ and $ErCl_3$ were mixed at a volume ratio of 15.4 mL:4 mL:0.6 mL and added into a 100 mL three-neck Erlenmeyer flask. The molar ratio of lanthanide ions in the mixture was $Y^{3+}:Yb^{3+}:Er^{3+}=77:20:3$.

(2) 20 mL of 0.2 M ethylene glycol bis (b-aminoethylether) tetraacetic acid (EGTA) solution was introduced to the solution prepared in (1).

(3) A solution of KF was prepared by dissolving 2.1 g of KF in 60 mL of de-ionized water. The solution prepared in (2) was injected into the KF solution at 100° C. The mixture was stirred vigorously for 1 h at room temperature.

(4) The obtained precipitates were centrifuged, washed three times with de-ionized water, and dried. The average diameter of the precursor particles was 60 nm.

(5) The precursors obtained in (4) were heated at 410° C. for 1 h. The nanometer-sized up-converting fluorescent particles were then obtained.

Example 11

Preparation of Up-converting Fluoride Phosphors with TTHA Chelator (II)

(1) Stock solutions of $YCl_3$, $YbCl_3$ and $ErCl_3$ were mixed at a volume ratio of 15.4 mL:4 mL:0.6 mL and added into a 100 mL three-neck Erlenmeyer flask. The molar ratio of lanthanide ions in the mixture was $Y^{3+}:Yb^{3+}:Er^{3+}=77:20:3$.

(2) 20 mL of 0.2 M TTHA solution was introduced to the solution prepared in (1).

(3) A solution of $NH_4F$ was prepared by dissolving 2.1 g of $NH_4F$ in 60 mL of deionized water. The solution prepared in (2) was injected into the $NH_4F$ solution at 100° C. The mixture was stirred vigorously for 1 h at room temperature.

(4) The obtained precipitates were centrifuged, washed three times with deionized water, and dried. The average diameter of the precursor particles was 60 nm.

(5) The precursors obtained in (4) were heated at 410° C. for 1 h. The nanometer-sized up-converting fluorescent particles were then obtained.

Example 12

Preparation of Up-converting Fluoride Phosphors with DTPA Chelator (1) Stock solutions of $YCl_3$, $YbCl_3$ and $HoCl_3$ were mixed at a volume ratio of 14 mL:6 mL:0.0002 mL and added into a 100 mL three-neck Erlenmeryer flask. The molar ratio of lanthanide ions in the mixture was $Y^{3+}:Yb^{3+}:Er^{3+}=77:20:3$.

(2) 20 mL of 0.2 M DTPA solution was introduced to the solution prepared in (1).

(3) A solution of NaF was prepared by dissolving 2.1 g of NaF in 60 mL of deionized water. The solution prepared in (2) was injected into the NaF solution at 80° C. The mixture was stirred vigorously for 1 h at room temperature.

(4) The obtained precipitates were centrifuged, washed three times with deionized water, and dried. The average diameter of the precursor particles was 50 nm.

(5) The precursors obtained in (4) were heated at 360° C. for 10 h. The nanometer-sized up-converting fluorescent particles were then obtained.

Example 13

Preparation of Up-converting Fluoride Phosphors with HEDTA Chelator (II)

(1) Stock solutions of $YCl_3$, $YbCl_3$ and $TmCl_3$ were mixed at a volume ratio of 14 mL:5.96 mL:0.04 mL and added into a 100 mL three-neck Erlenmeryer flask. The molar ratio of lanthanide ions in the mixture was $Y^{3+}:Yb^{3+}:Tm^{3+}=70:29.8:0.2$.

(2) 20 mL of 0.2 M HEDTA solution was introduced to the solution prepared in (1).

(3) A solution of NaF was prepared by dissolving 2.1 g of NaF in 60 mL of deionized water. The solution prepared in (2) was injected into the NaF solution. The mixture was stirred vigorously for 1 h at room temperature.

(4) The obtained precipitates were centrifuged, washed three times with deionized water, and dried. The average diameter of the precursor particles was 60 nm.

(5) The precursors obtained in (4) were heated at 400° C. for 3 h. The nanometer-sized up-converting fluorescent particles were then obtained.

Example 14

Preparation of Up-converting Fluoride Phosphors with DCTA Chelator (1) Stock solutions of $YCl_3$, $YbCl_3$ and $ErCl_3$ were mixed at a volume ratio of 14 mL:6 mL:0.001 mL and added into a 100 mL three-neck Erlenmeryer flask. The molar ratio of lanthanide ions in the mixture was $Y^{3+}:Yb^{3+}:Er^{3+}=70:30:0.005$.

(2) 20 mL of 0.2 M DCTA solution was introduced to the solution prepared in (1).

(3) A solution of $NH_4F$ was prepared by dissolving 2.1 g of $NH_4F$ in 60 mL of deionized water. The solution prepared in (2) was injected into the $NH_4F$ solution at 80° C. The mixture was stirred vigorously for 1 h at room temperature.

(4) The obtained precipitates were centrifuged, washed three times with deionized water, and dried.

(5) The precursors obtained in (4) were heated at 400° C. for 4 h. The nanometer-sized up-converting fluorescent particles were then obtained.

Example 15

Preparation of Up-converting Fluoride Phosphors with EGTA Chelator (II)

(1) Stock solutions of $YCl_3$, $YbCl_3$ and $ErCl_3$ were mixed at a volume ratio of 17.4 mL:2 mL:0.6 mL and added into a 100 mL three-neck Erlenmeryer flask. The molar ratio of lanthanide ions in the mixture was $Y^{3+}:Yb^{3+}:Er^{3+}=87:10:3$.

(2) 20 mL of 0.2 M EGTA solution was introduced to the solution prepared in (1).

(3) A solution of NaF was prepared by dissolving 2.1 g of NaF in 50 mL of deionized water followed by addition of 0.2 M EGTA solution 10 mL. The solution prepared in (2) was injected into the NaF solution at 40° C. The mixture was stirred vigorously for 1 h at room temperature.

(4) The obtained precipitates were centrifuged, washed three times with deionized water, and dried.

(5) The precursors obtained in (4) were heated at 400° C. for 3 h. The nanometer-sized up-converting fluorescent particles were then obtained.

Example 16

Preparation of Up-converting Fluoride Phosphors with TTHA Chelator (II)

(1) Stock solutions of $YCl_3$, $YbCl_3$ and $ErCl_3$ were mixed at a volume ratio of 15 mL:2 mL:3 mL and added into a 100 mL three-neck Erlenmeryer flask. The molar ratio of lanthanide ions in the mixture was $Y^{3+}:Yb^{3+}:Er^{3+}=75:10:15$.

(2) A quantity of 20 mL of 0.2 M TTHA solution was introduced to the solution prepared in (1).

(3) A solution of $NH_4F$ was prepared by dissolving 2.1 g of $NH_4F$ in 60 mL of deionized water. The solution prepared in (2) was injected into the $NH_4F$ solution at room temperature. The mixture was stirred vigorously for 1 h at room temperature.

(4) The obtained precipitates were centrifuged, washed three times with deionized water, and dried.

(5) The precursors-obtained in (4) were heated at 400° C. for 2 h. The nanometer-sized up-converting fluorescent particles were then obtained.

Example 17

Surface Modification of Nanometer-scale Up-converting Phosphors

An aliquot of 10 mL isopropanol containing 20 mg of nanometer-scaled fluoride phosphor particles was sonicated thoroughly, until a homogenous colloid-like state of the suspension was reached. Small amount of large-sized particles settled at the bottom, and were discarded.

Approximately 74 mL of isopropanol was added to a 100 mL Erlenmeryer flask. It was magnetically stirred and heated to 40° C. in an oil bath. The colloid-like homogenous up-converting phosphor suspension was then added into the flask, with subsequent addition of 6.75 mL of deionized water and 8.25 mL of 25% ammonium hydroxide. The flask was then sealed. After the mixture was magnetically stirred for 10 min, 0.08 mmol of tetraethyl orthosilicate (TEOS) was added into the flask-and the reaction was kept on for 1 h. A quantity of 0.07 mmol of 3-aminopropyltriethoxysilane (APTES) was then added into the reaction system and the suspension was stirred for an additional 3 h at 40° C. The mixture was transferred to centrifuge tubes and centrifuged at 12,000 rpm. The supernatant was discarded and pellets washed twice with deionized water. The resulting white powder was dried in oven at 60° C.

The APTES-modified dry powder (4 mg) was re-suspended in 2 mL of 1× phosphate buffered saline (PBS buffer, 4 g sodium chloride, 0.1 g potassium chloride, 1.56 g sodium hydrogenphosphate, 0.1 g potassium dihydrogenphosphate in 500 mL of MilliQ $H_2O$, pH 7.4). After a sonication period of 30 min, the suspension was added with 50 μl of 50% glutaraldehyde aqueous solution and 15 mg of sodium cyanoborohydride ($NaCNBH_3$) to introduce aldehyde groups onto the silanized particle surface. The reaction was kept on for 2 h at 4° C. with sonication. The suspension was centrifuged and the pellet washed using 1× PBS buffer three times. The pellet was then re-suspended in 1 mL of 1× PBS buffer (CHO-modified up-converting phosphor particle stock, approximately 4 mg/mL).

Example 18

Covalent Conjugation of NeutrAvidin with Up-converting Phosphor

NeutrAvidin (2 mg, Pierce) was dissolved in 0.1 mL of MilliQ $H_2O$. The volume was adjusted to 250 mL by addition of 1× PBS buffer.

A suspension of 0.25 mL of the 4 mg/mL CHO-modified up-converting phosphor particle stock prepared in Example 17 was sonicated for 10 min followed by the addition of the 2 mg/mL NeutrAvidin solution. Adjust the final volume to 1 mL using 1× PBS buffer. The reaction was kept on for 1 h at room temperature on a vibration station to complete the covalent conjugation of the particle to the protein molecule via aldehyde-amino group reaction. An aliquot of 5 μL of 5 M $NaCNBH_3$ solution was added to the mixture to reduce the Schiff base product resulted from the aldehyde-amino group reaction. After 1 h of incubation, 20 μL of 3 M tris(hydroxymethyl)aminomethane (Tris) solution was added into the system to block the excess aldehyde groups on the particle surface.

The resulting suspension was centrifuged and washed using 1× PBS buffer three times. The pellet was re-suspended into 1× PBS buffer and ready for the subsequent usage in bio-molecular assays The above examples are included for illustrative purposes only and are not intended to limit the scope of the invention. Many variations to those described above are possible. Since modifications and variations to the examples described above will be apparent to those of skill in this art, it is intended that this invention be limited only by the scope of the appended claims.

What is claimed is:

1. A process of preparing a phosphor fluoride particle that emits light in the visible wavelength range when excited by long wavelength light that has a uniform particle size of less than 350 nanometers, which process comprises:
    a) preparing an aqueous solution of soluble salts of a phosphor host, an absorber/emitter pair and a rare-earth metal chelator; and
    b) contacting said prepared aqueous solution of soluble salts of said phosphor host, absorber/emitter pair and rare-earth metal chelator with an aqueous fluoride-containing compound at a temperature ranging from about 0° C. to about 100° C. for a sufficient time to obtain a precipitate of a phosphor fluoride particle; and
    c) heating said precipitate at a temperature ranging from about 300° C. to about 450° C. for a time ranging from about 1 hour to about 10 hours to obtain a phosphor fluoride particle that emits light in the visible wavelength range when excited by long wavelength light that has a uniform particle size of less than 350 nanometers.

2. The process of claim 1, wherein the phosphor host is selected from the group consisting of yttrium, lanthanum and gadolinium.

3. The process of claim 1, wherein the absorber is ytterbium and the emitter is selected from the group consisting of erbium, holmium, terbium and thulium.

4. The process of claim 1, wherein the rare-earth metal chelator is selected from the group consisting of ethylenediamineteraacetic acid, triethylenetetraaminhexaacetic acid, diethylenetriaminepentaacetic acid, hydroxyethylethylenediaminetriacetic acid, 1,2-diaminocyclohexanetetraacetic acid, ethylene glycol bis (b-aminoethylether) tetraacetic acid and a salt thereof.

5. The process of claim 1, wherein the aqueous fluoride-containing compound is selected from the group consisting of NaF, KF, $NH_4F$ and HF.

6. The process of claim 1, wherein the aqueous fluoride-containing compound is contained in an aqueous solution prior to or concurrently with contacting with the prepared aqueous solution of soluble salts of the phosphor host, the absorber/emitter pair and the rare-earth metal chelator.

7. The process of claim 1, wherein the soluble salts of the phosphor host and the absorber/emitter pair are obtained by dissolving the corresponding metal oxide in hydrochloric acid or nitric acid and subsequently removing the residual acid.

8. The process of claim 1, wherein the amount of the rare-earth metal chelator is about 0-1 times the amount of total rare-earth ions in the aqueous solution.

9. The process of claim 1, further comprising coating the prepared phosphor fluoride particle with a transparent layer.

10. The process of claim 9, wherein the transparent layer is $SiO_2$.

11. The process of claim 9, further comprising coating the transparent layer coated phosphor fluoride particle with a layer of immobilized biological moiety.

12. The process of claim 2, wherein the phosphor host is yttrium.

13. The process of claim 3, wherein the absorber is ytterbium and the emitter is erbium.

14. The process of claim 12, wherein the absorber is ytterbium and the emitter is erbium.

* * * * *